United States Patent [19]

Daendliker et al.

[11] Patent Number: 4,740,078

[45] Date of Patent: Apr. 26, 1988

[54] FORCE MEASURING APPARATUS AND METHOD USING STRESS-INDUCED BIREFRINGENCE IN A SINGLE-MODE OPTICAL FIBER

[75] Inventors: Rene Daendliker, Corcelles; Axel Bertholds, Neuchatel, both of Switzerland

[73] Assignee: Mettler Instrumente AG, Greifensee, Switzerland

[21] Appl. No.: 690,997

[22] Filed: Jan. 14, 1985

[30] Foreign Application Priority Data

Jan. 24, 1984 [CH] Switzerland ............................ 300/84

[51] Int. Cl.$^4$ ................................................ G01L 1/24
[52] U.S. Cl. .................................... 356/35.5; 356/367; 250/227
[58] Field of Search ................ 356/73.1, 33, 35.5, 356/364, 365, 367, 366, 345; 250/225

[56] References Cited

U.S. PATENT DOCUMENTS

| 3,556,662 | 5/1968 | Levenstein et al. | 356/367 |
| 4,442,350 | 4/1984 | Rashleigh | 250/227 |

FOREIGN PATENT DOCUMENTS

| 0120999 | 10/1984 | European Pat. Off. | |
| 3039235 | 5/1982 | Fed. Rep. of Germany | 250/207 |
| 3042794 | 6/1982 | Fed. Rep. of Germany | 250/227 |
| 3205798 | 8/1983 | Fed. Rep. of Germany | 250/227 |
| 3211828 | 10/1983 | Fed. Rep. of Germany | 250/227 |
| 1544483 | 4/1979 | United Kingdom | |

OTHER PUBLICATIONS

"Change of the Refractive Index in an Optical Fiber Due to External Forces", Nasano et al., *Applied Optics*, vol. 17, #13, 7/1978.

*Primary Examiner*—R. A. Rosenberger
*Assistant Examiner*—Crystal D. Cooper
*Attorney, Agent, or Firm*—Laubscher & Laubscher

[57] ABSTRACT

The force measuring apparatus includes a single-mode optical fiber having a defined anisotropy, whereby coherent light suppled to one end of the optical fiber is guided as two waves having linear orthogonal polarizations, respectively. The optical fiber is arranged between a pair of parallel planar pressure plates, the orientation of the optical fiber being such that the aforementioned linear polarizations are parallel with and normal to the remote surfaces of the pressure plates, respectively. Upon the application of a force to be measured in the compressive direction normal to one remote surface of a plate, a phase shift is produced between the waves which is a function of the magnitude of the load to be measured, as determined by interferometer means arranged at the other end of the optical fiber. The optical fiber may be of a helical configuration having turns that are contained between successive pairs of pressure plates, respectively, arranged in a stack, thereby achieving a multiplication of the measuring effect with increased accuracy of the corresponding measurement.

4 Claims, 2 Drawing Sheets

FORCE MEASURING APPARATUS AND METHOD USING STRESS-INDUCED BIREFRINGENCE IN A SINGLE-MODE OPTICAL FIBER

BRIEF DESCRIPTON OF THE PRIOR ART

This invention relates to a method and apparatus for the measurement of force by the use of stress-induced birefringence in a single-mode optical fiber.

The measurement of force or pressure by means of stress-induced birefringence in a single-mode optical fiber is well known in the prior art. Likewise known are highly sensitive electro-optical methods for detecting polarization changes resulting from birefringence ("Messung mechanischer, thermischer und elecktrischer Groessen mit Lichtleitfasern", by R. Ulrich, LABO, October, 1980, pages 1083–1093; "Birefringence and Polarization Characteristics of Single-Mode Optical Fibers under Elastic Deformations",: by J.-I. Sakai, T. Kimura, IEEE Journal of Quantum Electronics, Vol. QE-17, No. 6, June 6, 1981, pages 1014–1051). Most uses of fiber-optical pressure sensors, however, relate to acoustic measurement and not to absolute static force measurement ("Optical Fiber Sensor Technology", T. G. Giallorenzi et al, IEEE Journal of Quantum Electronics, Vol. QE-18, No. 4, Apr. 1982, pages 626–664; "Acoustic Sensing with a Single Coiled Monomode Fiber", by S. C. Rashleigh, Optics Letters, Vol. 5, No. 9, September 1980, pages 392–394). Moreover, the previously described measurement methods are not suitable for the achievement of high measurement accuracy over a broad measurement range (i.e., with a resolution $>10^4$). Additional problems arise when the optical fiber is inherently optically anisotropic, that is to say, it is birefringement independent of its geometric shape or of the force acting upon it.

R. Ulrich, loc. cit., describes a force measurement instrument in which the force to be measured acts in a vertical direction laterally upon a straight single-mode optical fiber arranged between two pressure plates. The stress generated in the optical fiber by the action of force thereon produces an optical anisotropy causing the refractive index to be raised in the horizontal direction and lowered in the vertical direction. Polarized light is supplied to the optical fiber from a laser. As a result of the anisotropically-produced birefringence, orthogonal polarization states arise in the optical fiber in both horizontal and vertical directions. The resultant polarization state is measured and indicated in a polarimeter. It was also known elsewhere that one can achieve higher sensitivity and measurement accuracy by the use of interferometric measurement means.

Force measurement mechanisms of this kind normally require the use of an inherently optically isotropic optical fiber. Commercially available singel-mode optical fibers, however, do not meet this requirement, Owing to manufacturing tolerances, they are more or less anisotropic, whereby the orientation of the anisotropy along the optical fiber can vary and differ from one specimen to the next. A uniform series of force measurement instruments cannot be achieved on the basis of such undefined optical conditions.

SUMMARY OF THE INVENTION

The present invention was developed to provide an improved force measuring apparatus that is substantially independent of the inherent birefringence properties of the optical fiber, and which provides a high degree of measurement accuracy, together with the corresponding method.

According to a primary object of the invention, a force measuring apparatus and method are provided including a single-mode anisotropic optical fiber arranged for lateral compression between a pair of parallel pressure plates, means supplying coherent light to one end of the optical fiber to produce a pair of light waves contained in orthogonally arranged planes that are parallel with and normal to the remote surfaces of the plates, respectively, and interferometer means arranged at the other end of the optical fiber for measuring the phase shift produced by the application of force to be measured in a compressive direction normal to the remote surface of one of the plates, thereby to provide an indication of the magnitude of that force.

According to a more specific object of the invention, a single-mode optical fiber is provided having an inherent anisotropy whose orientation corresponds with the direction of force application. The inherent anisotropy can be obtained through the curvature of the optical fiber along its length. The resultant anisotropy by far exceeds the inherent anisotropy of a commercially available, straight single-mode optical fiber with round core cross-section, which substantially has no influence on the measurement process. The measuring apparatus of the present invention is characterized in that at least a portion of the optical fiber runs between the pressure plates along a curved line, for example, in a round open loop. The resultant birefringence has the same orientation along the entire length of the optical fiber with necessarily corresponds with the direction of force.

According to an alternate embodiment of the invention, the defined anisotropy can also be generated during the manufacture of the optical fiber. Of course, in arranging such a optical fiber with inherent anisotropy in the measurement arrangement, the predetermined orientation of the anisotropy of the optical fiber must be maintained over the entire operating range of the force. This can be achieved by providing the anisotropic optical fiber, during manufacture, with a cross-sectional configuration that deviates from a circular configuration, for example, an elliptical cross-sectional configuration, whose orientation agrees with the optical anisotropy. Known methods for making a birefringence single-mode optical fiber reside, for example, in the fact that the core cross-section is given an elliptical configuration or that anisotropic mechanical stresses are created inside the fiber, especially in the light-conducting core. In these cases, moreover, the optical fiber preferably extends along a curved line in the measurement arrangement. In this way, under certain circumstances a higher difference in the refraction coefficients can be achieved in both polarization directions.

According to a further object of the invention, the light supplied to the optical fiber comprises linearly-polarized light having a plane of oscillation inclined at an angle of 45° with respect to the direction of the force to be measured so that the orthogonal polarization states will be excited with the same amplitude. For this purpose, a correspondingly oriented polarizer is provided between the light source and the input end of the fiber.

In operation, the degree of phase shift between the light waves travelling in the two orthogonal polarization states by the application of the force to be measured in a compressive direction on the plates between which the optical fiber is arranged is a function of the magnitude of the force to be measured. The pressure exerted upon the optical fiber (force per unit of length) is decisive for the degree of phase shift and thus for the level of measurement sensitivity. This pressure is limited by the condition that the change in the configuration of the optical fiber, which is brought about under its influence, must take place within the framework of Hooke's Law. Under this assumption, the integrated effect along the optical fiber is proportional to the force to be measured. The length of the optical fiber arranged between two pressure plates depends—at a given maximum pressure—only on the maximum force to be measured, that is to say, it depends on the desired nominal load of the force measurement arrangement.

According to another object of the invention, increased measurement sensitivity can be achieved by providing the optical fiber with a helical configuration to define a plurality of turns that are contained between pairs of pressure plates, respectively. In this way, the phase shift produced by the action of the force is multiplied in accordance with the number of turns of the optical fiber.

The interferometer measuring means includes, in the simplest case, two photo-electric detectors in front of which is arranged a linear polarizer that is oriented an an angle of 45° relative to the direction of application of the force to be measured. Furthermore, optical phase retardation elements can be provided which cause the electrical detector signals to be respectively phase-shifted by a fixed amount (for example, 90°); this facilitates the determination of the signal passages and thus the control of an electronic interference period counter. For phase measurement, an analog circuit or a microprocessor may be used. In this way the phase difference can be accurately determined to less than 90° over many interference periods. An improved arrangement with four detectors permits a considerably more accurate interpolation also in case of intensity and contrast changes.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
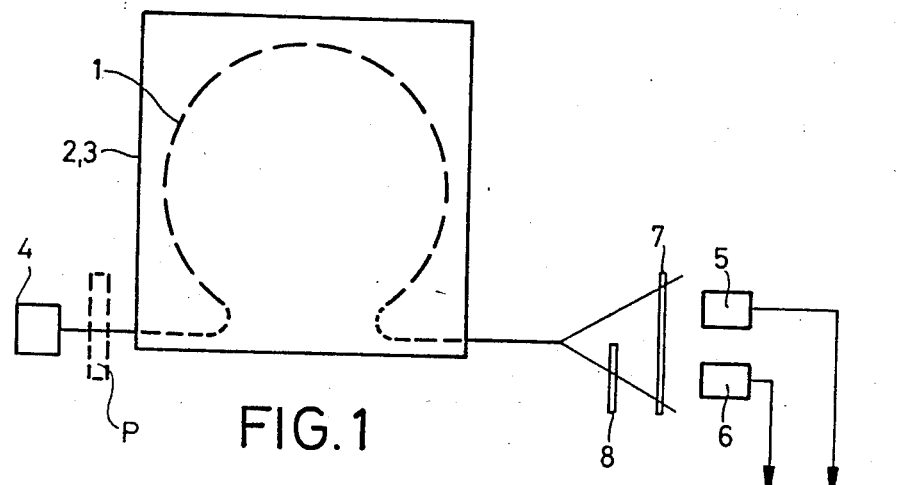
FIG. 1 is a diagrammatic illustration of a first embodiment of the measuring apparatus of the present invention.
Figure 2:
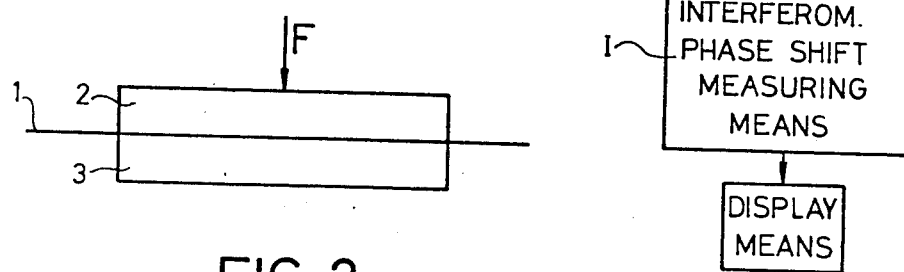
FIG. 2 is a top plan view of the pressure plate and optical fiber assembly of FIG. 1.

In the single-layer embodiment of FIGS. 1 and 2, the single-mode anisotrophic optical fiber 1 has the form of a single circular loop which is arranged between two parallel planar pressure plates 2 and 3. The force to be measured F acts orthogonally upon the outer surface of pressure plate 2 and is thus transmitted to pressure plate 3 solely via optical fiber 1, whereby the force is imparted laterally upon that portion of the optical fiber contained between the pressure plates. The optical fiber may be formed of a suitable material having anisotropic properties, as is known in the optical fiber art. Since the pressure plates 2 and 3 have no optical function, they may be formed of either opaque or transparent materials, such as steel or glass. A continuously operable semiconductor laser 4 supplies into the optical fiber 1 coherent, linearly-polarized light having an oscillation plane inclined at an angle of 45° relative to the direction of the force to be measured F. A linear polarizer plate P may be provided between the light source and the input end of the optical fiber, which polarizer has the aforementioned 45° orientation relative to the direction of application of force F. By virtue of the curvature of optical fiber 1, a defined anisotropy is effected in the optical fiber, thereby producing a birefringence which has an identical orientation along the optical fiber 1. Specifically, the birefringence generates two linearlypolarized waves with orthogonal polarization directions one of which is parallel to the direction of the measurement force F. Between the orthogonal waves there develops a phase shift which depends on the degree of anisotropy or of birefringence and which is determined by the magnitude of force F. During the transition form an unloaded condition to a loaded condition of the measuring apparatus, there thus arises a change in the phase shift between the two waves which is a function of the force F that is to be measured. This phase change is detemined by conventional interferometer means I.

It is known in the art to provide, for the interferometric determinaion of a phase shift of two light waves, an optical-electronic interference measuring means including an interference period counter and a phasemeter. In the example at hand, two photoelectic detectors 5 and 6 are provided in front of which there is arranged a linear polarizer 7 that is oriented at an angle of 45° to the direction of the measuring force F. The two detectors pick up the light signal components coming from a semicircular portion of the linear polarizer 7 and convert them into corresponding electrical signals for the control of the interference period counter and the phasemeter. Also arranged in front of detector 6 is a quarter-wave plate 8 having the same orientation as the measuring force F, thereby causing the two detector signals to be phase-shifted, respectively, by 90°. Various electronic phase detector means for analyzing this detector signal for the determination of the phase angle $\phi$ are in themselves known and are not illustrated here.

To maintain a linear relationship between the phase change and the measuring force, a commercially available single-mode optical fiber with a diameter of, for example, $125\mu$, can be stressed with about 20N/cm transversely applied pressure. For a nominal value of the measurement force F of 1,000N, for example, a optical fiber is required having a length in the pressure range amounting to about 50 cm. One can show that, with a comparatively simple interference measurement device, a measurement accuracy of 0.1N in the range from 0 to 1,000N can be achieved.

The described measurement arrangement furthermore offers the advantage of being simple in design, self-supporting, and stable.

Figure 3:
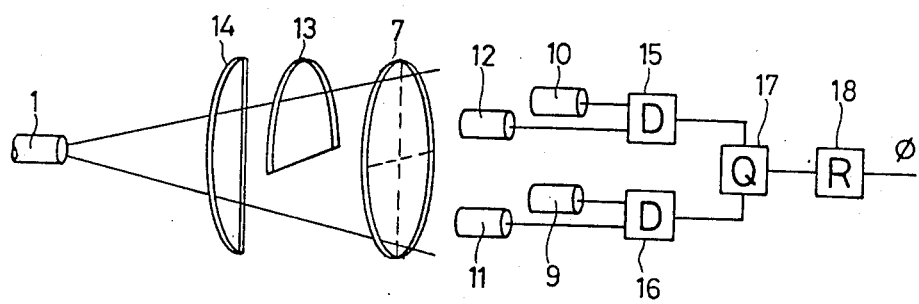
FIG. 3 is a schematic diagram of a second embodiment of the detector means of FIG. 1.

Referring now to the embodiment of FIG. 3, an improved interference measurement mechanism is illustrated which facilitates more accurate interpolation of the measurement value within an interference period. Four photoelectric detectors 9, 10, 11, and 12 are provided, each of which scans a quadrant of the linear polarizer 7. Connected in front of the detectors are partly optical delay elements which cause the four detector signals to be phase-shifted by 90°, respectively. In the illustrated embodiment, no delay element is arranged in front of the first detector 9, while a quarter-wave plate 13 is arranged in front of the second detector 10, a half-wave plate 14 is arranged in front of the third detector 11, and the one-fourth-wave plate 13 and one-half-wave plate 14 are arranged in front of the fourth detector 12, the arrangements in each case having the same orientation as the force F to be measured.

The differential values of the signals from the detectors 9, 11, and 10, 12, are formed in each case by differential electronic calculation means 15 and 16, respectively, while the quotient of both differential signals is formed by quotient electronic calculation means 17. This quotient represents the tangent of the phase angle $\phi$, and resultant electronic calculation means 18 determines from this tangent the phase angle $\phi$. The designs of the various electronic calculation means for the above-mentioned purpose are well known in the art and are therefore not described in greater detail here.

Figure 4:
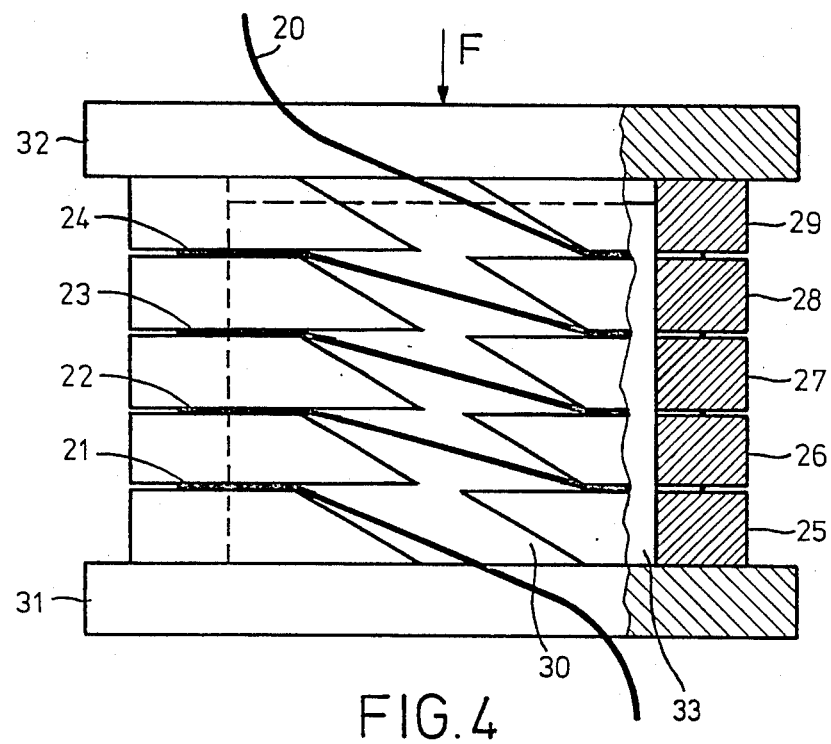
FIG. 4 is a partly sectioned side elevation view of a second embodiment of the invention wherein the turns of a helical optical fiber extend between respective pairs of pressure plates arranged in a stack.

Referring now to the multi-turn embodiment of FIG. 4, the optical fiber 20 is made in the form of a helix, and in this example the optical fiber includes four turns 21–24 which are arranged between respective pairs of a stack of annular pressure plates 25–29. Oblique slits 30 in the pressure plates facilitate the transition of the optical fiber 20 from one winding plane to the other. Pressure plates 25–29 are arranged between two terminal plates 31 and 32, whereby on the lower terminal plate 31 there is provided a vertical rod 33 for the guidance of the annular pressure plates, the measuring force F acting upon the upper terminal plate 32.

Each of the individual turns 21–24 of the optical fiber 20 is under the action of the entire measuring force F and is correspondingly dimensioned according to the same criteria as the simple optical fiber loop in the single-layer measurement arrangement according to FIGS. 1 and 2. By virtue of the multiple (in this example, four-fold) action of the full measurement force F upon optical fiber 20, the phase change, generated by the way in which the birefringenece is influenced in terms of force, is quadrupled. In this way, the measurement sensitivity can be increased significantly if the optical fiber has the corresponding number of windings.

What is claimed is:

1. Force measuring apparatus, comprising:
(a) a single-mode optical fiber (1) having inlet and outlet end portions, and a curved intermediate portion contained solely in a given plane, the curvature of said intermediate portion being such as to produce an inherent well-defined controlled anisotropy extending along the length of said intermediate portion, thereby to cause the resultant birefringence produced by the lateral compression of said intermediate portion to have the same orientation along the entire length thereof;
(b) force-responsive means for laterally compressing said curved optical fiber intermediate portion, said force-responsive means including at least two parallel spaced pressure plates (2,3) having planar adjacent surfaces on opposite sides of, and in engagement with, said optical fiber curved portion, respectively;
(c) laser means (4) for introducing coherent light into said optical fiber inlet end portion, thereby to excite in said optical fiber, due to the birefringence caused by the inherent optical anisotropy thereof, a pair of linearly polarized light waves having orthogonally-arranged planes of oscillation, said optical fiber being so arranged relative to said plates that said planes of oscillation are parallel with and normal to said adjacent faces of said pressure plates, respectively, whereby when a compressive force to be measured (F) is applied in a direction normal to said pressure plate adjacent faces, a phase shift is produced between said light waves as a function of the degree of change in the stress-induced birefringence; and
(d) means including interferometer means (5–8) for measuring the magnitude of the applied force as a function of the phase shift between said light waves.

2. Force measuring apparatus, comprising
(a) an anisotropic single-mode optical fiber (1) of well-defined anisotropy having inlet and outlet ends;
(b) a stack of parallel spaced annular pressure plates (25–29), said optical fiber having a helical configuration defining turns (21–24) contained between, and in contiguous relation with, the adjacent faces of successive pairs of said plates, respectively;
(c) laser means (4) for introducing coherent light into one end of said optical fiber, thereby exciting in said optical fiber, due to birefringence caused by the optical anisotropy, a pair of linearly polarized light waves having orthogonal planes of oscillation, said optical fiber turns being so arranged relative to said plates that said planes of oscillation are parallel with and normal to the remote parallel surfaces of said pressure plate stack, respectively, whereby when a compressive force to be measured (F) is applied in a direction normal to one of said remote surfaces, an additional phase shift is produced between said light waves by stress-induced birefringence; and
(d) means including interferometer means (5–8) for measuring the magnitude of the applied force as a function of the phase shift between said light waves.

3. Force measuring apparatus, comprising:
(a) a single-mode optical fiber (1) having inlet and outlet end portions, and an intermediate portion of non-circular cross-section such as to produce an inherent well-defined controlled anisotropy extending along the length of said intermediate portion, thereby to cause the resultant birefringence produced by the lateral compression of said intermediate portion to have the same orientation along the entire length thereof;
(b) force-responsive means for laterally compressing said optical fiber intermediate portion, said force-responsive means including at least two parallel spaced pressure plates (2,3) having planar adjacent surfaces on opposite sides of, and in engagement with, said optical fiber intermediate portion, respectively;
(c) laser means (4) for introducing coherent light into said optical fiber inlet end portion, thereby exciting in said optical fiber, due to the birefringence caused by the optical anisotropy, a pair of linearly polarized light waves having orthogonal planes of oscillation, said optical fiber being so arranged relative to said plates that said planes of oscillation are parallel with and normal to the remote parallel surfaces of pressure plates, respectively, whereby when a compressive force to be measured (F) is applied in a direction normal to said pressure plate adjacent faces, a phase shift is produced between said light waves by the stress-induced birefingence; and (d) means including interferometer means (5-8) for measuring the magnitude of the applied force as a function of the phase shift between said light waves.

4. Apparatus as defined in claim 3, wherein at least a portion of said optical fiber intermediate portion between said pressure plates is curved and contained in a given plane for lateral compression by said pressure plates.

* * * * *